(12) United States Patent
Belaiche

(10) Patent No.: US 8,116,198 B2
(45) Date of Patent: *Feb. 14, 2012

(54) METHOD FOR CONFIGURING A TELECOMMUNICATION SYSTEM

(75) Inventor: Vincent Antoine Victor Belaiche, Vitre (FR)

(73) Assignee: Research In Motion Limited, Waterloo, Ontario (CA)

( * ) Notice: Subject to any disclaimer, the term of this patent is extended or adjusted under 35 U.S.C. 154(b) by 1692 days.

This patent is subject to a terminal disclaimer.

(21) Appl. No.: 11/241,988

(22) Filed: Oct. 4, 2005

(65) Prior Publication Data

US 2006/0083190 A1    Apr. 20, 2006

Related U.S. Application Data

(60) Division of application No. 10/253,819, filed on Sep. 25, 2002, now Pat. No. 7,012,894, which is a continuation of application No. 09/641,918, filed on Aug. 21, 2000, now Pat. No. 6,510,137.

(30) Foreign Application Priority Data

Aug. 19, 1999 (FR) .................................. 99 10752

(51) Int. Cl.
 *G08C 15/00* (2006.01)
 *H04B 3/46* (2006.01)

(52) U.S. Cl. ......... 370/229; 370/342; 370/401; 375/225
(58) Field of Classification Search ...................... None
 See application file for complete search history.

(56) References Cited

U.S. PATENT DOCUMENTS

| 4,694,467 | A | * | 9/1987 | Mui | ............................. 375/144 |
| 4,736,372 | A |   | 4/1988 | Mueller et al. | |
| 4,860,283 | A | * | 8/1989 | Takano et al. | ................. 370/536 |
| 5,212,687 | A |   | 5/1993 | De La Bourdonnaye | |
| 5,280,503 | A | * | 1/1994 | Betts et al. | ..................... 375/377 |

(Continued)

FOREIGN PATENT DOCUMENTS

EP    0 327 101    8/1989

(Continued)

OTHER PUBLICATIONS

Ericsson, Mitsubishi Electric, Siemens, "Text Proposal for Rate Matching Signaling," XP002137935, Jul. 12-16, 1999, pp. 1-8.

(Continued)

*Primary Examiner* — Chirag Shah
*Assistant Examiner* — Joshua Smith
(74) *Attorney, Agent, or Firm* — Finnegan, Henderson, Farabow, Garrett & Dunner LLP

(57) ABSTRACT

A method and system for configuring a CDMA telecommunication system having at least one sending entity and at least one receiving entity, each entity configured to transmit data on at least one physical channel (DPDCH) via a transport channel composite (CCTrCH) of multiple transport channels. At least one entity includes a data processing module configured to determine for each transport channel a first parameter (RMi) proportional to a rate matching ratio (RFi) and a second parameter representing a maximum physical bit rate (Ndata) and to transform for each of the transport channels a number of symbols before rate matching (Nk) into a number of symbols after rate matching (Nk+ΔNk), where the number of symbols after rate matching (Nk+ΔNk) is obtained approximately by multiplying the number of symbols before rate matching (Nk) by the rate matching ratio (RFi).

4 Claims, 7 Drawing Sheets

U.S. PATENT DOCUMENTS

| | | | |
|---|---|---|---|
| 5,313,492 A | | 5/1994 | Hashimoto et al. |
| 5,394,439 A | * | 2/1995 | Hemmati ............... 375/242 |
| 5,537,398 A | * | 7/1996 | Siwiak ................... 370/204 |
| 5,541,955 A | | 7/1996 | Jacobsmeyer |
| 5,619,524 A | * | 4/1997 | Ling et al. ............. 375/130 |
| 5,657,015 A | * | 8/1997 | Nakajima et al. ........ 341/61 |
| 5,687,095 A | * | 11/1997 | Haskell et al. ...... 375/240.03 |
| 5,687,257 A | * | 11/1997 | Paik et al. ........... 375/240.03 |
| 5,689,511 A | * | 11/1997 | Shimazaki et al. ....... 370/545 |
| 5,712,860 A | * | 1/1998 | Hardin ................... 370/296 |
| 5,757,813 A | | 5/1998 | Raith |
| 5,854,576 A | * | 12/1998 | Swan ..................... 375/371 |
| 5,982,813 A | | 11/1999 | Dutta et al. |
| 5,995,536 A | * | 11/1999 | Arkhipkin et al. ...... 375/141 |
| 6,011,950 A | * | 1/2000 | Young .................... 370/535 |
| 6,084,916 A | * | 7/2000 | Ott ........................ 375/259 |
| 6,166,667 A | | 12/2000 | Park |
| 6,356,569 B1 | * | 3/2002 | Sonalkar et al. ........ 370/545 |
| 6,377,550 B1 | * | 4/2002 | Prasad ................. 370/236.1 |
| 6,381,216 B1 | * | 4/2002 | Prasad ................. 370/236.1 |
| 6,389,000 B1 | | 5/2002 | Jou |
| 6,397,367 B1 | | 5/2002 | Park et al. |
| 6,400,703 B1 | | 6/2002 | Park et al. |
| 6,473,442 B1 | | 10/2002 | Lundsjo et al. |
| 6,501,748 B1 | | 12/2002 | Belaiche |
| 6,510,137 B1 | * | 1/2003 | Belaiche ................. 370/232 |
| 6,519,233 B1 | | 2/2003 | Gutierrez |
| 6,545,983 B2 | | 4/2003 | Belaiche |
| 6,658,056 B1 | * | 12/2003 | Duruoz et al. ............ 375/240 |
| 7,149,185 B1 | * | 12/2006 | Suni ....................... 370/230 |
| 7,773,518 B2 | * | 8/2010 | Belaiche ................. 370/232 |
| 7,855,964 B2 | * | 12/2010 | Belaiche ................. 370/232 |
| 7,864,680 B2 | * | 1/2011 | Belaiche ................. 370/232 |
| 2003/0123412 A1 | | 7/2003 | Belaiche |
| 2004/0165673 A1 | | 8/2004 | Belaiche |
| 2005/0259582 A1 | | 11/2005 | Belaiche |

FOREIGN PATENT DOCUMENTS

| | | |
|---|---|---|
| JP | 2002-527934 | 8/2002 |
| JP | 3554969 B2 | 5/2004 |
| JP | 3577076 B2 | 7/2004 |
| JP | 3768501 B2 | 2/2006 |
| JP | 3768521 B2 | 2/2006 |
| JP | 3795060 B2 | 4/2006 |
| JP | 3795061 B2 | 4/2006 |
| JP | 4486912 | 4/2010 |
| WO | WO 00/62465 | 10/2000 |

OTHER PUBLICATIONS

Mitsubishi Electric, "A Rule to Determine the Rate Matching Ratio," XP002137936, Jun. 1-4, 1999, pp. 1-5.

Office Action issued Jul. 26, 2011 in Japan Application No. 2011-070272 (With English Translation).

Japanese Decision to Grant Patent issued on Apr. 19, 2011 in corresponding Japanese Application No. 2009-274708 (with an English Translation).

Office Action issued Oct. 5, 2010, in Japan Patent Application No. 2009-274708.

Decision to Grant Patent for related Japanese Application 2011-070272, dated Sep. 13, 2011, (with translation) (6 pages).

* cited by examiner

METHOD FOR CONFIGURING A TELECOMMUNICATION SYSTEM

CROSS REFERENCE TO RELATED APPLICATION

This application is a Divisional of U.S. patent application Ser. No. 10/253,819 filed Sep. 25, 2002, now U.S. Pat. No. 7,012,894 which is a Continuation of and claims the benefit of priority from U.S. application Ser. No. 09/641,918 now U.S. Pat. No. 6,510,137, filed on Aug. 21, 2000. The entire contents of these applications are incorporated herein by reference.

BACKGROUND OF INVENTION

The 3GPP (3rd Generation Partnership Project) Committee is an organization whose members originate from various regional standardization organizations and particularly the ETSI (European Telecommunication Standardization Institute) for Europe and the ARIB (Association of Radio Industries and Businesses) for Japan, and the purpose of which is to standardize a 3rd generation telecommunication system for mobiles. The CDMA (Code Division Multiple Access) technology has been selected for these systems. One of the fundamental aspects distinguishing 3rd generation systems from 2nd generation systems, apart from the fact that they make more efficient use of the radio spectrum, is that they provide very flexible services. 2nd generation systems offer an optimized radio interface only for some services, for example the GSM (Global System for Mobiles) system is optimized for voice transmission (telephony service). 3rd generation systems have a radio interface adapted to all types of services and service combinations.

Therefore, one of the benefits of 3rd generation mobile radio systems is that they can efficiently multiplex services that do not have the same requirements in terms of Quality of Service (QoS), on the radio interface. In particular, these quality of service differences imply that the channel encoding and channel interleaving should be different for each of the corresponding transport channels used, and that the bit error rates (BER) are different for each transport channel. The bit error rate for a given channel encoding is sufficiently small when the Eb/I ratio, which depends on the coding, is sufficiently high for all coded bits. Eb/I is the ratio between the average energy of each coded bit (Eb) and the average energy of the interference (I), and depends on the encoding. The term symbol is used to denote an information element that can be equal to a finite number of values within an alphabet, for example a symbol may be equivalent to a bit when it can only be one of two values.

The result is that since the various services do not have the same quality of service, they do not have the same requirement in terms of the Eb/I ratio. But yet, in a CDMA type system, the capacity of the system is limited by the level of interference. Thus, an increase in the energy of bits coded for a user (Eb) contributes to increasing interference (I) for other users. Therefore, the Eb/I ratio has to be fixed as accurately as possible for each service in order to limit interference produced by this service. An operation to balance the Eb/I ratio between the different services is then necessary. If this operation is not carried out, the Eb/I ratio would be fixed by the service with the highest requirement, and the result will be that the quality of the other services would be "too good", which would have a direct impact on the system capacity in terms of the number of users. This causes a problem, since rate matching ratios are defined identically at both ends of the radio link.

This invention relates to a method for configuring a telecommunication system to define rate matching ratios identically at both ends of a CDMA type radio link.

In the ISO's (International Standardization Organization) OSI (Open System Interconnection) model, a telecommunication equipment is modeled by a layered model comprising a stack of protocols in which each layer is a protocol that provides a service to the higher level layer. The 3GPP committee calls the service provided by the level 1 layer to the level 2 layer "transport channels". A transport channel (TRCH for short) enables the higher level layer to transmit data with a given quality of service. The quality of service is characterized in particular by a processing delay, a bit error rate and an error rate per block. A transport channel may be understood as a data flow at the interface between the level 1 layer and the level 2 layer in the same telecommunication equipment. A transport channel may also be understood as a data flow between the two level 2 layers in a mobile station, and in a telecommunication network entity connected to each other through a radio link. Thus, the level 1 layer uses suitable channel encoding and channel interleaving, in order to satisfy the quality of service requirement.

Solutions proposed by the 3GPP committee to achieve this balancing are illustrated in FIGS. 1 and 2. FIG. 1 is a diagrammatic view illustrating multiplexing of transport channels on the downlink according to the current proposal of the 3GPP committee. In the current proposal of this committee, the symbols processed until the last step 130 described below are bits.

With reference to FIG. 1, a higher level layer 101 periodically supplies transport block sets to the level 1 layer. These sets are supplied in transport channels reference 100. A periodic time interval with which the transport block set is supplied to the transport channel is called the Transmission Time Interval (TTI) of the transport channel. Each transport channel has its own TTI time interval which may be equal to 10, 20, 40 or 80 ms. FIG. 2 shows examples of transport channels A, B, C and D. In this figure, the transport block set received by each transport channel is represented by a bar in the histogram. The length of the bar in the histogram represents a TTI interval of the associated transport channel and its area corresponds to the useful load in the transport block set. With reference to FIG. 2, the duration of the TTI intervals associated with transport channels A, B, C and D is equal to 80 ms, 40 ms, 20 ms and 10 ms respectively. Furthermore, the dotted horizontal lines in the histogram bars indicate the number of transport blocks in each transport block set. In FIG. 2, transport channel A receives a first transport block set $A_0$ comprising three transport blocks during a first transmission time interval, and a second transport block set $A_1$ comprising a single transport block during the next TTI interval. Similarly, transport channel B receives transport block sets $B_0$, $B_1$, $B_2$ and $B_3$ during four consecutive TTI intervals, comprising 0, 2, 1 and 3 transport blocks respectively. Transport channel C receives transport block sets $C_0$ to $C_7$ during eight successive TTI intervals and finally transport channel D receives transport block sets $D_0$ to $D_{15}$ during sixteen TTI intervals.

Note that a TTI interval for a given transport channel cannot overlap two TTI intervals in another transport channel. This is possible because TTI intervals increase geometrically (10 ms, 20 ms, 40 ms and 80 ms). Note also that two transport channels with the same quality of service necessarily have the same TTI intervals. Furthermore, the term "transport format" is used to describe the information representing the number of transport blocks contained in the transport block set received by a transport channel and the size of each transport block. For a given transport channel, there is a finite set of possible transport formats, one of which is selected at each TTI interval as a function of the needs of higher level layers. In the case of a constant rate transport channel, this set only includes a single element. On the other hand, in the case of a variable rate transport channel, this set comprises several elements and therefore the transport format can vary from one TTI interval to the other when the rate itself varies. In the example shown in FIG. 2, transport channel A has a first transport format for the set $A_0$ received during radio frames 0 to 7, and a second transport format for set $A_1$ during radio frames 8 to 15.

According to the assumptions currently made by the 3GPP committee, there are two types of transport channels, namely real time transport channels and non real time transport channels. No automatic repeat request (ARQ) is used in the case of an error with real time transport channels. The transport block set contains at most one transport block and there is a limited number of possible sizes of this transport block. The expressions "block size" and "number of symbols per block" will be used indifferently in the rest of this description.

For example, the transport formats defined in the following table may be obtained:

| Transport format index | Number of transport blocks | Corresponding transport block size |
|---|---|---|
| 0 | 0 | — |
| 1 | 1 | 100 |
| 2 | 1 | 120 |

In this table, the minimum rate is zero bit per TTI interval. This rate is obtained for transport format 0. The maximum rate is 120 bits per TTI interval and it is obtained for transport format 2.

Automatic repetition can be used in the case of an error with non-real time transport channels. The transport block set contains a variable number of transport blocks of the same size. For example, the transport formats defined in the following table may be obtained:

| Transport format index | Number of transport blocks | Transport block size |
|---|---|---|
| 0 | 1 | 160 |
| 1 | 2 | 160 |
| 2 | 3 | 160 |

In this table, the minimum rate is 160 bits per TTI interval. This rate is obtained for transport format 0. The maximum rate is 480 bits per TTI interval and is obtained for transport format 2.

Thus, considering the example shown in FIG. 2, the following description is applicable for transport channels A, B, C and D:

| Transport channel TTI interval | A 80 ms | |
|---|---|---|
| Transport formats | | |
| Transport format index | Number of transport blocks | Transport block size |
| 0 | 1 | 160 |
| 1 | 2 | 160 |
| 2 | 3 | 160 |

In FIG. 2, the transport block set $A_0$ is in transport format 2, whereas $A_1$ is in transport format 0.

| Transport channel TTI interval | B 40 ms | |
|---|---|---|
| Transport formats | | |
| Transport format index | Number of transport blocks | Transport block size |
| 0 | 0 | — |
| 1 | 2 | 80 |
| 2 | 1 | 80 |
| 3 | 3 | 80 |

In FIG. 2, transport block sets $B_0$, $B_1$, $B_2$ and $B_3$ are in transport formats 0, 1, 2 and 3 respectively.

| Transport channel TTI interval | C 20 ms | |
|---|---|---|
| Transport formats | | |
| Transport format index | Number of transport blocks | Transport block size |
| 0 | 0 | — |
| 1 | 1 | 100 |
| 2 | 1 | 120 |

In FIG. 2, transport block sets $C_0$, $C_1$, $C_2$, $C_3$, $C_4$, $C_5$, $C_6$ and $C_7$ are in transport formats 2, 2, 1, 2, 2, 0, 0 and 2 respectively.

| Transport channel TTI interval | D 10 ms | |
|---|---|---|
| Transport formats | | |
| Transport format index | Number of transport blocks | Transport block size |
| 0 | 0 | — |
| 1 | 1 | 20 |
| 2 | 2 | 20 |
| 3 | 3 | 20 |

In FIG. 2, transport block sets $D_0$ to $D_{15}$ are in transport formats 1, 2, 2, 3, 1, 0, 1, 1, 1, 2, 2, 0, 0, 1, 1 and 1 respectively.

For each radio frame, a transport format combination (TFC) can then be formed starting from the current transport formats for each transport channel. With reference to FIG. 2, the transport format combination for frame 0 is ((A,2), (B,0), (C,2), (D,1)). It indicates that transport formats for transport channels A, B, C and D for frame 0 are 2, 0, 2, and 1 respectively. Index 5 is associated with this transport format combination in the following table that illustrates a possible set of transport format combinations to describe the example in FIG. 2:

| Combination index | Transport format for transport Channels | | | | Frame number with this combination |
|---|---|---|---|---|---|
| | A | B | C | D | |
| 0 | 0 | 2 | 0 | 0 | 11 |
| 1 | 0 | 2 | 0 | 2 | 10 |
| 2 | 0 | 3 | 0 | 0 | 12 |

-continued

| Combination index | Transport format for transport Channels | | | | Frame number with this combination |
|---|---|---|---|---|---|
| | A | B | C | D | |
| 3 | 0 | 3 | 0 | 1 | 13 |
| 4 | 0 | 2 | 2 | 1 | 8 |
| 5 | 2 | 0 | 2 | 1 | 0 |
| 6 | 0 | 2 | 2 | 2 | 9 |
| 7 | 2 | 1 | 1 | 0 | 5 |
| 8 | 2 | 0 | 2 | 2 | 1 and 2 |
| 9 | 0 | 3 | 2 | 1 | 14 and 15 |
| 10 | 2 | 1 | 1 | 1 | 4 |
| 11 | 2 | 0 | 2 | 3 | 3 |
| 12 | 2 | 1 | 2 | 1 | 6 and 7 |

Therefore, with reference once again to FIG. 1, each transport channel reference 100 receives a transport block set at each associated TTI interval originating from a higher level layer 101. Transport channels with the same quality of service are processed by the same processing system 102A, 102B. A frame checking sequence (FCS) is assigned to each of these blocks during a step 104. These sequences are used in reception to detect whether or not the received transport block is correct. The next step, reference 106, consists of multiplexing the various transport channels with the same quality of service (QoS) with each other. Since these transport channels have the same quality of service, they can be coded in the same way. Typically, this multiplexing operation consists of an operation in which transport block sets are concatenated. The next step consists of carrying out a channel encoding operation, 108, on multiplexed sets of blocks. The result at the end of this step is a set of coded transport blocks. A coded block may correspond to several transport blocks. In the same way as a sequence of transport block sets forms a transport channel, a sequence of sets of coded transport blocks is called a coded transport channel. Channels coded in this way are then rate matched in a step 118 and are then interleaved on their associated TTI intervals in a step 120 and are then segmented in a step 122. During the segmentation step 122, the coded transport block sets are segmented such that there is one data segment for each multiplexing frame in a TTI interval in the channel concerned. A multiplexing frame is the smallest time interval for which a demultiplexing operation can be operated in reception. In our case, a multiplexing frame corresponds to a radio frame and lasts for 10 ms.

As already mentioned, the purpose of the rate matching step (118) is to balance the Eb/I ratio on reception between transport channels with different qualities of service. The bit error rate BER on reception depends on this ratio. In a system using the CDMA multiple access technology, the quality of service that can be obtained is greater when this ratio is greater. Therefore, it is understandable that transport channels with different qualities of service do not have the same needs in terms of the Eb/I ratio, and that if the rate is not matched, the quality of some transport channels would be "too" good since it is fixed by the most demanding channel and would unnecessarily cause interference on adjacent transport channels. Therefore, matching the rate also balances the Eb/I ratio. The rate is matched such that N input symbols give N+ΔN output symbols, which multiplies the Eb/I ratio by the $$\frac{N + \Delta N}{N}$$

ratio. This $$\frac{N + \Delta N}{N}$$

ratio is equal to the rate matching ratio RF, except for rounding.

In the downlink, the peak/average ratio of the radio frequency power is not very good, since the network transmits to several users at the same time. Signals sent to these users are combined constructively or destructively, thus inducing large variations in the radio frequency power emitted by the network, and therefore a bad peak/average ratio. Therefore, for the downlink it was decided that the Eb/I ratio will be balanced between the various transport channels by rate matching using a semi-static rate matching ratio $$RF \approx \frac{N + \Delta N}{N},$$

and that multiplexing frames would be padded by dummy symbols, in other words non-transmitted symbols (discontinuous transmission). Dummy symbols are also denoted by the abbreviation DTX (Discontinuous Transmission). Semi-static means that this RP ratio can only be modified by a specific transaction implemented by a protocol from a higher level layer. The number of DTX symbols to be inserted is chosen such that the multiplexing frame padded with DTX symbols completely fills in the Dedicated Physical Data Channel(s) (DPDCH).

This discontinuous transmission degrades the peak/average ratio of the radio frequency power, but this degradation is tolerable considering the simplified construction of the receiving mobile station obtained with a semi-static rate matching ratio.

Referring once again to FIG. 1, the transport channels with different qualities of service after encoding, segmentation, interleaving and rate matching are multiplexed to each other in a step 124 in order to prepare multiplexing frames forming a transport channel composite. This multiplexing is done for each multiplexing frame individually. Since the rate of the multiplexed transport channels may be variable, the composite rate obtained at the end of this step is also variable. The capacity of a physical channel referred to as a DPDCH (Dedicated Physical Data Channel) is limited, consequently it is possible that the number of physical channels necessary to transport this composite may be greater than one. When the required number of physical channels is greater than one, a segmentation step 126 for this composite is included. For example, in the case of two physical channels, this segmentation step 126 may consist of alternately sending one symbol to the first of the two physical channels denoted DPDCH#1, and a symbol to the second physical channel denoted DPDCH#2.

The data segments obtained are then interleaved in a step 128 and are then transmitted on the physical channel in a step 130. This final step 130 consists of modulating the symbols transmitted by spectrum spreading.

DTX symbols are dynamically inserted either for each TTI interval separately in a step 116, or for each multiplexing frame separately in a step 132. The rate matching ratios $RF_i$ associated with each transport channel i are determined such as to minimize the number of DTX symbols to be inserted when the total transport channel composite rate after the multiplexing step 124 is maximum. The purpose of this technique is to limit degradation of the peak/average ratio of the radio frequency power in the worst case.

The rate is matched by puncturing ($RF_i<1$, $\Delta N<0$) or by repetition ($RF_i>1$, $\Delta N>0$). Puncturing consists of deleting $-\Delta N$ symbols, which is tolerable since they are channel encoded symbols, and therefore despite this operation, when the rate matching ratio $RF_i$ is not too low, channel decoding in reception (which is the inverse operation of channel encoding) can reproduce data transported by the transport channels without any error (typically when $RF_i \geq 0.8$, in other words when not more than 20% of symbols are punctured).

DTX symbols are inserted during one of the two mutually exclusive techniques. They are inserted either in step 116 using the "fixed service positions technique, or in step 132 using the "flexible service positions" technique. Fixed service positions are used since they enable to carry out a blind rate detection with acceptable complexity. Flexible service positions are used when there is no blind rate detection. Note that the DTX symbols insertion step 116 is optional.

During step 116 (fixed service positions), the number of DTX symbols inserted is sufficient so that the data flow rate after this step 116 is constant regardless of the transport format of the transport channels before this step 116. In this way, the transport format of the transport channels may be detected blind with reduced complexity, in other words without transmitting an explicit indication of the current transport format combination on an associated dedicated physical control channel (DPCCH). Blind detection consists of testing all transport formats until the right encoding format is detected, particularly using the frame checking sequence FCS.

If the rate is detected using an explicit indication; the DTX symbols are preferably inserted in step 132 (flexible service positions). This makes it possible to insert a smaller number of DTX symbols when the rates on two composite transport channels are not independent, and particularly in the case in which they are complementary since the two transport channels are then never at their maximum rate simultaneously.

At the present time, the only algorithms that are being defined are the multiplexing, channel encoding, interleaving and rate matching algorithms. A rule needs to be defined to fix a relation in the downlink between the number N of symbols before rate matching and the variation $\Delta N$ corresponding to the difference between the number of symbols before rate matching and the number of symbols after rate matching.

Consider the example shown in FIG. 2. Transport channel B accepts four transport formats indexed from 0 to 3. Assume that the coded transport channel originating from transport channel B produces not more than one coded block for each transport format, as shown in the following table.

| Transport channel<br>TTI interval | | B<br>40 ms | | |
|---|---|---|---|---|
| Transport formats | | | | |
| Transport format index | Number of transport blocks | Transport block size | Number of coded blocks | Coded block size (N) |
| 0 | 0 | — | 0 | — |
| 1 | 2 | 80 | 1 | 368 |
| 2 | 1 | 80 | 1 | 192 |
| 3 | 3 | 80 | 1 | 544 |

Assume that $RF_B=1.3333$ is the rate matching ratio, then the variation $\Delta N$ generated by rate matching varies with each transport format, for example as in the following table:

| Transport channel<br>TTI interval | | B<br>40 ms | |
|---|---|---|---|
| Transport formats | | | |
| Transport format index | Number of coded blocks | Coded block size (N) | Variation ($\Delta N$) |
| 0 | 0 | — | — |
| 1 | 1 | 368 | 123 |
| 2 | 1 | 192 | 64 |
| 3 | 1 | 544 | 181 |

Thus, the existence of this type of rule to calculate the variation $\Delta N$ as a function of the number N of symbols before rate matching could simplify negotiation of the connection. Thus, according to the example in the above table, instead of providing three possible variations $\Delta N$, it would be sufficient to supply a restricted number of parameters to the other end of the link that could be used to calculate them. An additional advantage is that the quantity of information to be supplied when adding, releasing or modifying the rate matching of a transport channel, is very small since parameters related to other transport channels remain unchanged.

A calculation rule was already proposed during meeting No. 6 of the work sub-group WG1 of sub-group 3GPP/TSG/RAN of the 3GPP committee in July 1999 in Espoo (Finland). This rule is described in section 4.2.6.2 of the proposed text presented in document 3GPP/TSG/RAN/WG1/TSGR1#6 (99)997 "Text Proposal for rate matching signaling". However, it introduces a number of problems as we will demonstrate. Note the notation used in this presentation is not exactly the same as the notation in document TSGR1#6(99) 997 mentioned above.

In order to clarify the presentation, we will start by describing the notation used in the rest of the description.

Let i denote the index representing the successive values 1, 2, ..., T of the coded transport channels, then the set of indexes of the transport formats of the coded transport channel i are denoted TFS(i), for all values of $i \in \{1, \ldots, T\}$. If j is the index of a transport format of a coded transport channel i, in other words $j \in TFS(i)$, the set of indexes of coded blocks originating from the coded transport channel i for transport format j is denoted CBS(i, j). Each coded block index is assigned uniquely to a coded block, for all transport formats and all coded transport channels. In summary we have:

$$\begin{cases} \forall\, i \in \{1, \ldots, T\} \\ \forall\, j \in TFS(i) \\ \forall\, i' \in \{1, \ldots, T\} \\ \forall\, j' \in TFS(i') \end{cases} (i, j) \neq (i', j') \Rightarrow CBS(i, j) \cap CBS(i', j') = \emptyset \quad (1)$$

where $\emptyset$ is an empty set. Note that for the purposes of this presentation, the index of a coded block does not depend on the data contained in this block, but it identifies the coded transport channel that produced this coded block, the transport format of this channel, and the block itself if this transport channel produces several coded blocks for this transport format. This block index is also called the coded block type. Typically, coded transport channel i does not produce more than 1 coded block for a given transport format j, and therefore CBS(i,j) is either an empty set or a singleton. If a coded transport channel i produces n coded blocks for transport format j, then CBS(i,j) comprises n elements.

We will also use TFCS to denote the set of transport format combinations. Each element in this set may be bi-univocally represented by a list of (i, j) pairs associating each coded transport channel indexed i in $\{1, \ldots, T\}$ with a transport format with index j in this coded transport channel (j∈TFS(i)). In other words, a transport format combination can determine a transport format j corresponding to each coded transport channel i. In the rest of this presentation, it is assumed that the set TFCS comprises C elements, the transport format combinations for this set then being indexed from 1 to C. If $\mathbf{l}$ is the index of a transport format combination, then the transport format index corresponding to the coded transport channel indexed i in the transport format combination with index $\mathbf{l}$ will be denoted $TF_i(\mathbf{l})$. In other words, the transport format combination with index $\mathbf{l}$ is represented by the following list:

$$((1, TF_1(\mathbf{l})), (2, TF_2(\mathbf{l})), \ldots, (T, TF_T(\mathbf{l})))$$

The set of block size indexes for any transport format combination $\mathbf{l}$ is denoted MSB($\mathbf{l}$). Therefore, we have:

$$\forall \mathbf{l} \in \{1, \ldots, C\} MSB(\mathbf{l}) = \bigcup_{1 \leq i \leq T} CBS(i, TF_i(\mathbf{l})) \quad (2)$$

Furthermore, the number of multiplexing frames in each transmission time interval on the coded transport channel i is denoted $F_i$. Thus, in the sending system shown in FIG. 1, any block originating from the coded transport channel i is segmented into $F_i$ blocks or segments. Based on the current assumptions made by the 3GPP committee, the sizes of these blocks are approximately equal. For example, if $F_i=4$ and the block on which segmentation step 122 is applied comprises 100 symbols, then the segments obtained at the end of this step 122 comprise 25 symbols. On the other hand, if the segmented block comprises only 99 symbols, since 99 is not a multiple of 4, then after segmentation there will be either 3 blocks of 25 symbols with 1 block of 24 symbols, or 4 blocks of 25 symbols with a padding symbol being added during the segmentation step 122. However, if X is the number of symbols in the block before segmentation step 122, it can be written that $$\left\lfloor \frac{X}{F_i} \right\rfloor$$

is the maximum number of symbols per segment, the notation $\lceil x \rceil$ denoting the smallest integer greater than or equal to x.

Finally, for a coded block with type or index k, the number of symbols in this coded block before rate matching is denoted $N_k$, and the variation between the number of symbols after rate matching and the number of symbols before rate matching is denoted $\Delta N_k$. Furthermore, note that in the rest of this text, the expressions "rate" and "number of symbols per multiplexing frame" are used indifferently. For a multiplexing frame with a given duration, the number of symbols expresses a rate as a number of symbols per multiplexing frame interval.

Now that the notation has been defined, we can describe the calculation rule described in document 3GPP/TSG/RAN/WG1/TSGR1#6(99)997 "Text proposal for rate matching signaling".

A prerequisite for this rule is to determine a transport format combination $\mathbf{l}_0$ for which the composite rate is maximum. For this transport format combination $\mathbf{l}_0$, the variations $\Delta N_k^{MF}$ for blocks with $N_k^{MF}$ symbols before rate matching will be determined. This is done only for transport format combination $\mathbf{l}_0$, in other words only for all values k ∈ MBS($\mathbf{l}_0$). The upper index MF in the $\Delta N_k^{MF}$ and $N_k^{MF}$ notations means that these parameters are calculated for a multiplexing frame and not for a TTI interval. By definition:

$$\begin{cases} \forall i \in \{1, \ldots, T\} \\ \forall j \in TFS(i) \quad N_k^{MF} = \left\lceil \frac{N_k}{F_i} \right\rceil \\ \forall k \in CBS(i, j) \end{cases} \quad (3)$$

The next step is to proceed as if the rate matching 118 was carried out after segmentation per multiplexing frame step 122 to define the variations $\Delta N_k^{MF}$. For flexible service positions, the variations $\Delta N_k^{MF}$ for k ∉MBS($\mathbf{l}_0$) are calculated using the following equation:

$$\begin{cases} \forall l \in \{1, \ldots, C\} \\ \forall k \in MSB(\mathbf{l}) \text{ and } k \notin MSB(\mathbf{l}_0) \end{cases} \Delta N_k^{MF} = \left\lfloor \frac{\Delta N_{K(k)}^{MF}}{N_{K(k)}^{MF}} \cdot N_k^{MF} \right\rfloor \quad (4)$$

where, for any coded block with index k, K(k) is the element of MSB($\mathbf{l}_0$) such that coded blocks with index k and K(k) originate from the same coded transport channel and where $\lfloor x \rfloor$ denotes the largest integer less than or equal to x.

For fixed service positions, the variations $\Delta N_k^{MF}$ for k ∉MSB($\mathbf{l}_0$) are calculated using the following equation:

$$\begin{cases} \forall l \in \{1, \ldots, C\} \\ \forall k \in MSB(\mathbf{l}) \text{ and } k \notin MSB(\mathbf{l}_0) \end{cases} \Delta N_k^{MF} = \Delta N_{K(k)}^{MF} \quad (4bis)$$

Note that the definition of K(k) does not create any problem with this method since, for any value of (i,j), CBS(i,j) comprises a single element and therefore if i is the index of the coded transport channel that produces the coded block with indexed size k, then K(k) is defined as being the single element of CBS(i,$\mathbf{l}_0$).

With this rule, it is guaranteed that CBS(i,j) is a singleton since, firstly the number of coded blocks per TTI interval is not more than one (basic assumption), and secondly when this number is zero it is considered that the block size is zero and CBS(i,j) then contains a single element k with $N_k=0$.

Finally, the set of variations $\Delta N_k$ is calculated using the following equation:

$$\begin{cases} \forall i \in \{1, \ldots, T\} \\ \forall j \in TFS(i) \quad \Delta N_k = F_i \cdot \Delta N_k^{MF} \\ \forall k \in CBS(i, j) \end{cases}$$

which, in terms of variation, corresponds to the inverse operation of equation (3), by reducing the considered multiplexing frame period to a TTI interval.

The following problems arise with this calculation rule:

1) nothing is written to say what is meant by the composite rate (the exact rate can only be determined when the variations ΔN have been calculated; therefore, it cannot be used in the calculation rule);

2) even if this concept were defined, it is probable that there are some cases in which the transport format combination that gives the maximum composite rate is not unique; the result is that the definition of the combination $1_o$ is incomplete;

3) equation (4) introduces a major problem. The transport format combination for which the composite rate is maximum is not necessarily such that all transport channels are simultaneously at their maximum rates. In the following, the number of symbols available per multiplexing frame for the CCTrCH composite will be called the maximum physical rate $N_{data}$. The maximum physical rate depends on the resources in allocated physical channels DPDCH. Therefore, it is possible that the maximum physical rate $N_{data}$ of the physical channel(s) carrying the composite is insufficient for all transport channels to be at their maximum respective rates simultaneously. Therefore in this case, there is no transport format combination in which all transport channels are at their maximum rates simultaneously. Thus, transport channel rates are not independent of each other. Some transport channels have a lower priority than others such that when the maximum physical rate $N_{data}$ is insufficient, only the highest priority transport channels are able to transmit, and transmission for the others is delayed. Typically, this type of arbitration is carried out in the medium access control (MAC) sub-level of the level 2 layer in the OSI model. Since transport channels are not necessarily at their maximum rates simultaneously when the composite is at its maximum rate in transport format combination $1_o$, in particular it is possible that one of them is at zero rate; therefore, it is possible to find a value $k_0 \in \text{MBS}$ ($1_o$) such that $N_{k_0}^{MF}=0$, and consequently $\Delta N_{k_0}^{MF} b=0$. If $k_1 \notin \text{MBS}(1_o)$ is such that $k_0=K(k_1)$, equation (4) then becomes as follows for $k=k_1$:

$$\Delta N_{k_1}^{MF} = \left\lfloor \frac{\Delta N_{k_0}^{MF}}{N_{k_0}^{MF}} \cdot N_{k_1}^{MF} \right\rfloor = \left\lfloor \frac{0}{0} \cdot N_{k_1}^{MF} \right\rfloor$$

It then includes a 0/0 type of indeterminate value. In the same way, it is possible that $N_{k_0}^{MF}$ is very small compared with $N_{k_1}^{MF}$, even if it is not 0. Thus, whereas the composite is in the transport format combination $1_0$ at its maximum rate, the transport channel corresponding to coded block indexes $k_0$ and $k_1$ is at a very low rate $N_{k_0}^{MF}$ compared with another possible rate $N_{k_1}^{MF}$ for the same transport channel. The result is that equation (4) giving $\Delta N_{k_1}^{MF}$ as a function of $\Delta N_{k_0}^{MF}$ amplifies the rounding error made during determination of $\Delta N_{k_0}^{MF}$ by a factor $$\frac{N_{k_1}^{MF}}{N_{k_0}^{MF}}$$

which is very large compared with one. However, such amplification of the rounding error in this way is not desirable.

One purpose of the invention is to suggest a rule for overcoming the disadvantages described above.

Another purpose of the invention is to provide this type of method that can define rate matching for the downlink for all possible situations, and particularly for at least one of the following cases:

when $\Delta N_{k_0}^{MF}$ and $N_{k_0}^{MF}$ are zero simultaneously;
the $$\frac{N_{k_1}^{MF}}{N_{k_0}^{MF}}$$

ratio is very large compared with 1;
the rate of at least some transport channels of a transport channel composite depends on at least some other transport channels in the same transport channel composite.

SUMMARY OF THE INVENTION

Consequently, the subject of the invention is a method for a telecommunication system including a plurality of communication devices, the telecommunication system using a Code Division Multiple Access type technology, at least one of the plurality of communication device transmitting data on at least one physical channel, the at least one physical channel transmitting a transport channel composite and having a maximum physical bit rate, the transport channel composite including data of a plurality of transport channels, each transport channel having at least one transport format, the at least one transport format being predetermined for each transport channel, each of the transport channels being processed by a separate and distinct processing procedure. The method includes the steps of: transforming, for each of the transport channels in the telecommunication system, an input number of bits into an output number of bits; calculating a ratio of said maximum physical rate to a maximum value of rate estimators in the telecommunication system by multiplying the ratio obtained in the calculating step by a rate matching parameter for the transport channel, the, rate matching parameter controlling the rate matching ratio for the transport channel; and determining, for each of the transport channels in the telecommunication system, a variation between the output number of bits and the input number of bits, the output number of bits being calculated by multiplying the rate matching ratio by the input number of bits, the determining step being implemented before the transforming step.

Another subject of the invention is a configuration apparatus for use in a telecommunication system including a plurality of entities, the telecommunication system using a Code Division Multiple Access type technology, at least one of the entities transmitting data on at least one physical channel, the at least one physical channel transmitting a transport channel composite and having a maximum physical bit rate, the transport channel composite including data of a plurality of transport channels, each transport channel having at least one transport format, the at least one transport format determined for each transport channel, each of the transport channels being processed by a separate and distinct processing procedure. The communication apparatus including: means for transforming, for each of the transport channels, an input number of bits into an output number of bits; means for calculating a ratio of the maximum physical bit rate to a maximum value of rate estimators; means for calculating a rate matching ratio of each of the transport channels by multiplying said ratio of the maximum physical bit rate to the maximum value of the rate estimators by a rate matching parameter determined for the transport channel, the rate matching parameter controlling the rate matching ratio for the transport channel; and means for determining, for each of the transport channels, a variation between the output number of bits and the input number of bits, the output number of bits being calculated by multiplying the rate matching ratio by the input number of bits.

BRIEF DESCRIPTION OF THE DRAWINGS

The invention will be better understood after reading the following description which is given solely as an example and which is given with reference to the attached drawings including FIGS. 3 to 5 which represent the different methods of calculating the variations $\Delta N_k$ according to the invention, and FIG. 6 represents a step in which the temporary variations are partially corrected.

DETAILED DESCRIPTION

Figure 1:
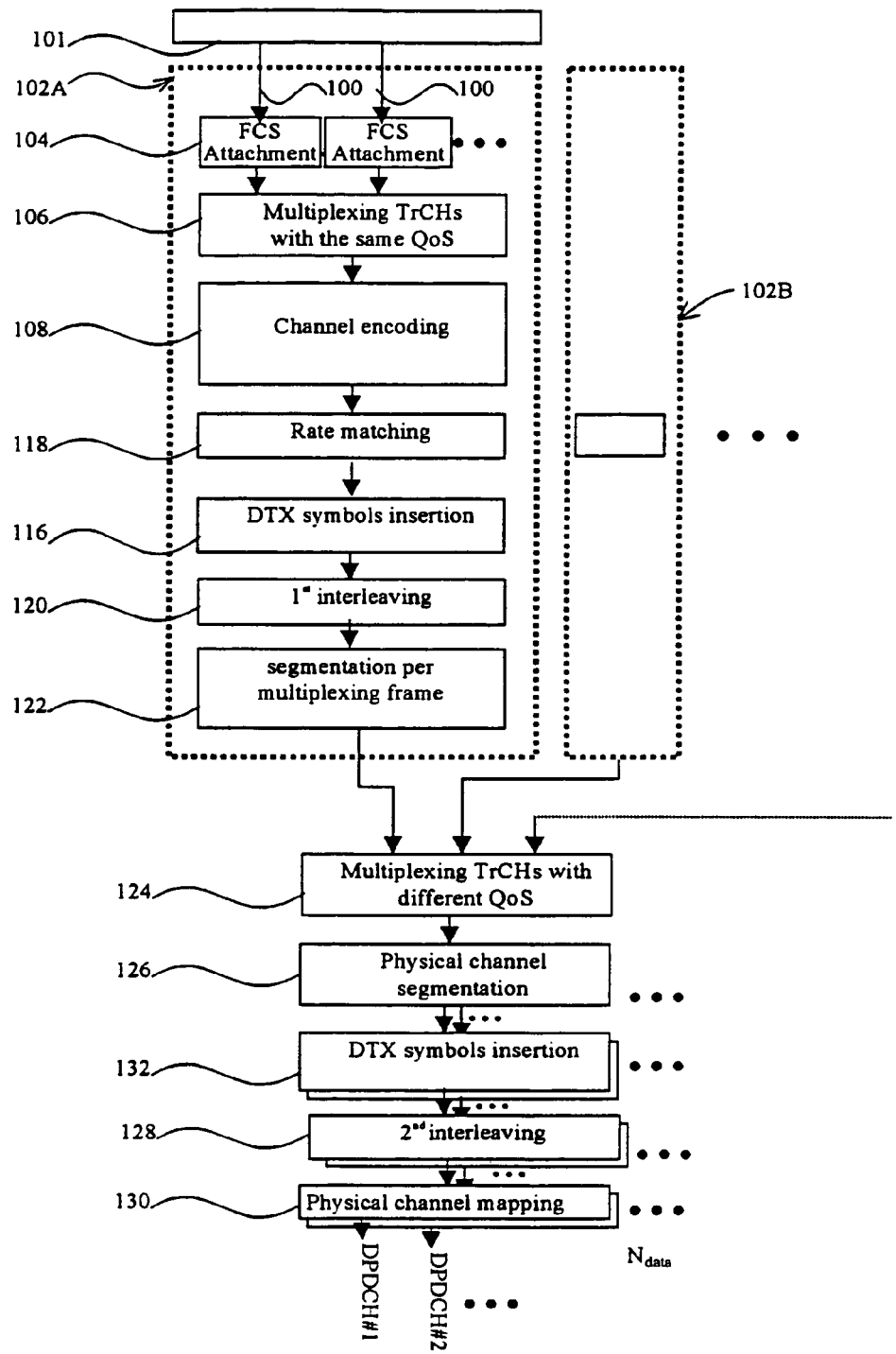
FIG. 1 is a flow diagram for the multiplexing of transport channels for the downlink according to the prior art.

The following description applies to the case of flexible service positions, unless specifically mentioned otherwise.

According to the invention, each coded transport channel i is characterized by two parameters $RM_i$ and $P_i$. The first parameter $RM_i$ represents a rate matching attribute for coded transport channel i. This attribute is proportional to the Eb/I ratio expected in reception, in other words if several coded transport channels denoted 1, 2, . . . , T, are considered with attributes denoted $RM_1$, $RM_2$, . . . , $RM_T$ respectively, then the expected Eb/I ratios for each coded transport channel will be in the same proportions as the $RM_i$ parameters. The second parameter $P_i$ is a coefficient corresponding to the maximum allowable puncturing ratio for a given coded transport channel i. Thus, a maximum puncturing ratio denoted $P_1$, $P_2$, . . . , $P_T$ is associated with each coded transport channel 1, 2, . . . , T. The maximum puncturing ratio is imposed by the channel coding used in the processing system specific to the coded transport channel considered. Puncturing consists of eliminating coded symbols. This elimination is tolerable since channel encoding introduces a redundancy. However, the number of punctured symbols cannot be too large compared with the total number of coded symbols, therefore there is a maximum puncturing ratio that depends on the channel coding and the decoder used in reception.

Furthermore, note that the maximum physical rate $N_{data}$ is the maximum number of symbols that can be transmitted in a multiplexing frame, allowing for the allocation of one or several physical channels DPDCH.

According to the invention, only the set of parameters $\{RM_i\}$ where $i \in [1,T]$, and $N_{data}$, are transmitted on a logical control channel associated with a previously existing coded transport channel composite, in order to enable each telecommunication system entity to know the set of correspondences between the numbers of symbols after rate matching $N+\Delta N$ and the numbers of symbols before rate matching N, for each coded transport channel. A logical channel denotes a channel that can connect two level 3 layer protocols, typically two Radio Resource Control (RRC) protocols. This type of logical channel is carried by one of the transport channels within a previously existing coded transport channel composite.

These parameters $(RM_i)_{i \in [1,T]}$ and $N_{data}$ may be determined by one of the entities, or they may be "negotiated" between several entities. Note that $N_{data}$ is a positive non-null integer and the $\{RM_i\}_{i \in [1,T]}$ parameters are also positive and non-null, and may also typically be expressed simply as binary numbers.

At the end of the negotiation, the $\{RM_i\}_{i \in [1,T]}$ and Ndata parameters come into force at a moment determined by the negotiation to define the (N, $\Delta N$) pairs for each coded transport channel and for each of their respective transport formats within a new transport channel composite. Note that this new composite is the result of the composite under formation before the instant at which the $RM_i$ and $N_{data}$ parameters came into force. This new composite typically replaces the previously existing composite on which the negotiation took place. It is impossible to make any negotiation when there is no previously existing transport channel composite on the dedicated physical channels DPDCH in duplex at the time that a transport channel composite is set up. Under these conditions, the number of coded transport channels T and the $\{RM_i\}_{i \in [1,T]}$ and $N_{data}$ parameters of the new coded transport channel composite are either predefined for the system, or are determined in a simplified negotiation for which dedicated physical data channels do not have to exist in advance. Typically, this type of negotiation may take place on common physical channels such as the Physical Random Access Channel (PRACH) for the uplink, and the Forward Access Channel (FACH) for the downlink. This simplified negotiation could also relate to a context including the $\{RM_i\}_{i \in [1,T]}$ and Ndata information, this context having been set up during a previous connection of dedicated physical data channels.

The $RM_i$ parameters are such that the rate matching ratios $RF_i$ associated with the same coded transport channel are proportional to the parameters, factored by a semi-static factor L independent of the coded transport channel i. Therefore, we have:

$$\forall i \; RF_i = L \cdot RM_i \tag{5}$$

Furthermore, the following must be satisfied in order to respect the constraint on the maximum puncturing ratio:

$$\forall i \; RF_i \geq 1 - P_i \tag{6}$$

Note that according to the invention, there is no need to know the value of each parameter $P_i$ to calculate the set of correspondences (N, $\Delta N$). The system of equations (5) and (6) is equivalent to the system of equations (5), (7) and (8) with respect to the factor L:

$$L \geq LMIN \tag{7}$$

where $$LMIN = \max_i \frac{1 - P_i}{RM_i} \tag{8}$$

Therefore, all that has to be known is LMIN or any other proportional value determined using a factor dependent on known data, for example $$PL = LMIN \cdot \min_i RM_i,$$

to have the same information on all possible values of the rate matching ratios $\{RF_i\}$. However, this is not necessary. In fact, the factor L is maximized as a function of $N_{data}$ such that the number of inserted DTX symbols is minimum when the transport channel composite rate is maximum. Consequently, since $N_{data}$ is sufficiently large so that equation (7) is satisfied when the L factor is at a maximum, there is no need to know the $P_i$ parameters or any other parameter (for example LMIN) giving a puncturing limit to determine the variations $\Delta N$. All that is necessary is that the method used to calculate the correspondences (N, $\Delta N$) maximizes the L factor, in other words minimizes the number of inserted DTX symbols for the maximum rate of the transport channel composite. However, this does not mean that the values of the $P_i$, PL or LMIN parameters are not negotiated. It simply means that all that is necessary to calculate correspondences (N, $\Delta N$) according to the invention is to know the value of the maximum physical rate $N_{data}$ in addition to the value of the parameters $\{RM_i\}$.

Thus, if 1 is the index of a transport formats combination, and if the coded transport channel i is in transport format index j in this transport formats combination (in other words $j=TF_i(1)$), then for each coded block with index k in coded transport channel i with format j (in other words $k \in CBS(i,j)$), if $N_k + \Delta N_k$ is the number of symbols before segmentation step 122, the segments will have not more than $$\left\lceil \frac{N_k + \Delta N_k}{F_i} \right\rceil$$

symbols at the end of this step. The result is that when considering all k type coded blocks, where $k \in CBS(i, TF_i(1))$ on the coded transport channel i for the transport formats combination with index 1 and all coded transport channels $i \in (1, \ldots, T)$, it is deduced that the total number of symbols D(1) in a multiplexing frame of the transport format combination, 1 is equal to not more than the following sum:

$$D(1) = \sum_{i=1}^{i=T} \sum_{k \in CBS(i,TF_i(1))} \left\lceil \frac{N_k + \Delta N_k}{F_i} \right\rceil \quad (9)$$

Furthermore, given the rate limits of the dedicated physical data channels, we have:

$$\forall 1 \in \{1, \ldots, C\} \; D(1) \leq N_{data} \quad (10)$$

Note that $N_{data} - D(1)$ is the number of DTX symbols inserted during step 132 for the transport formats combination 1.

Since it is required to minimize the number of DTX symbols inserted during step 132 when the transport channel composite rate is maximum, we need:

$$\max D(1) \approx N_{data}$$
$$1 \leq 1 \leq C \quad (11)$$

Also, according to the invention, the calculation of the variation $\Delta N_k$ for any value of k includes mainly three phases.

Figure 3:
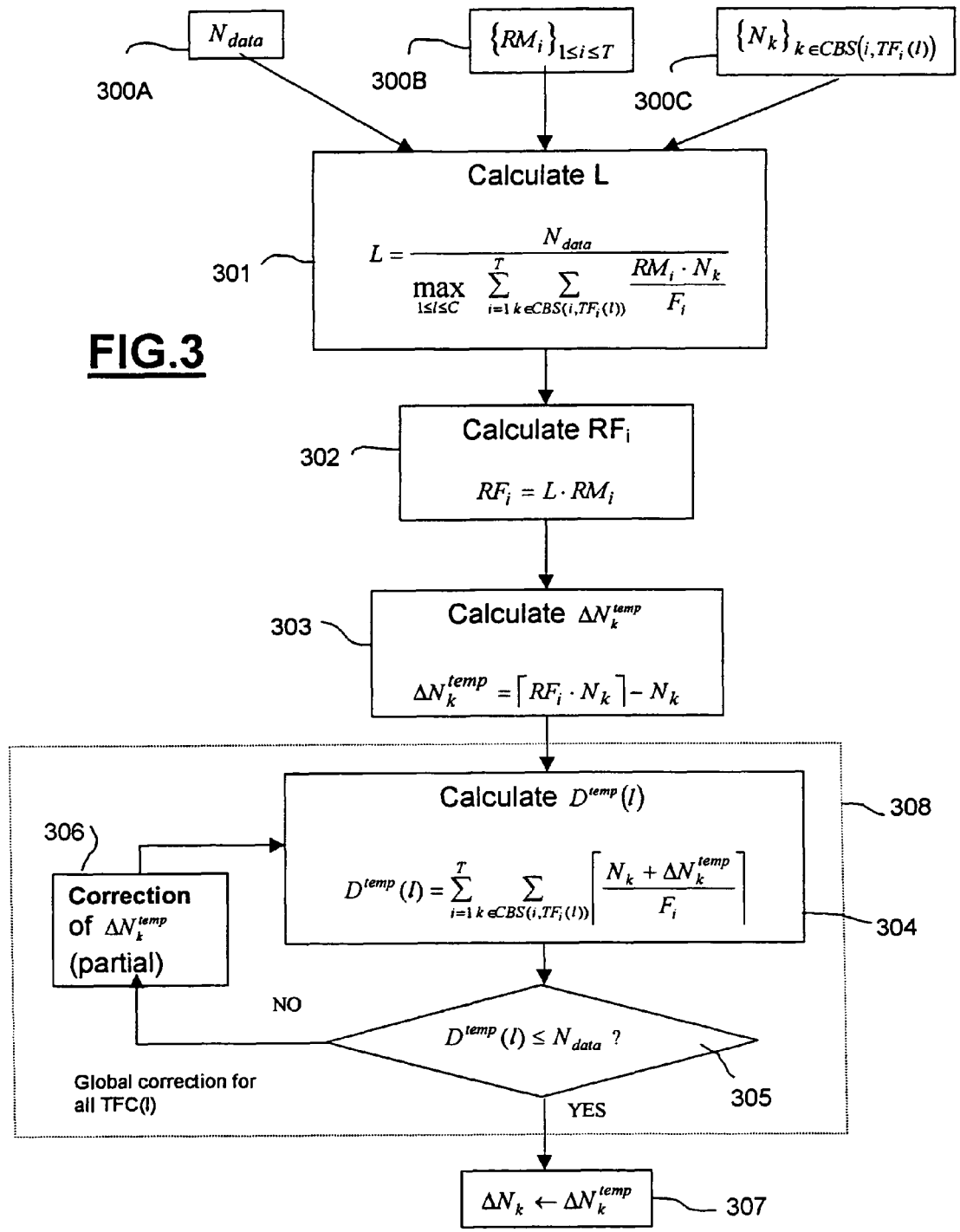
FIG. 3 is a flow diagram for explaining the implementation of the algorithm for the downlink according to the present invention.
Figure 4:
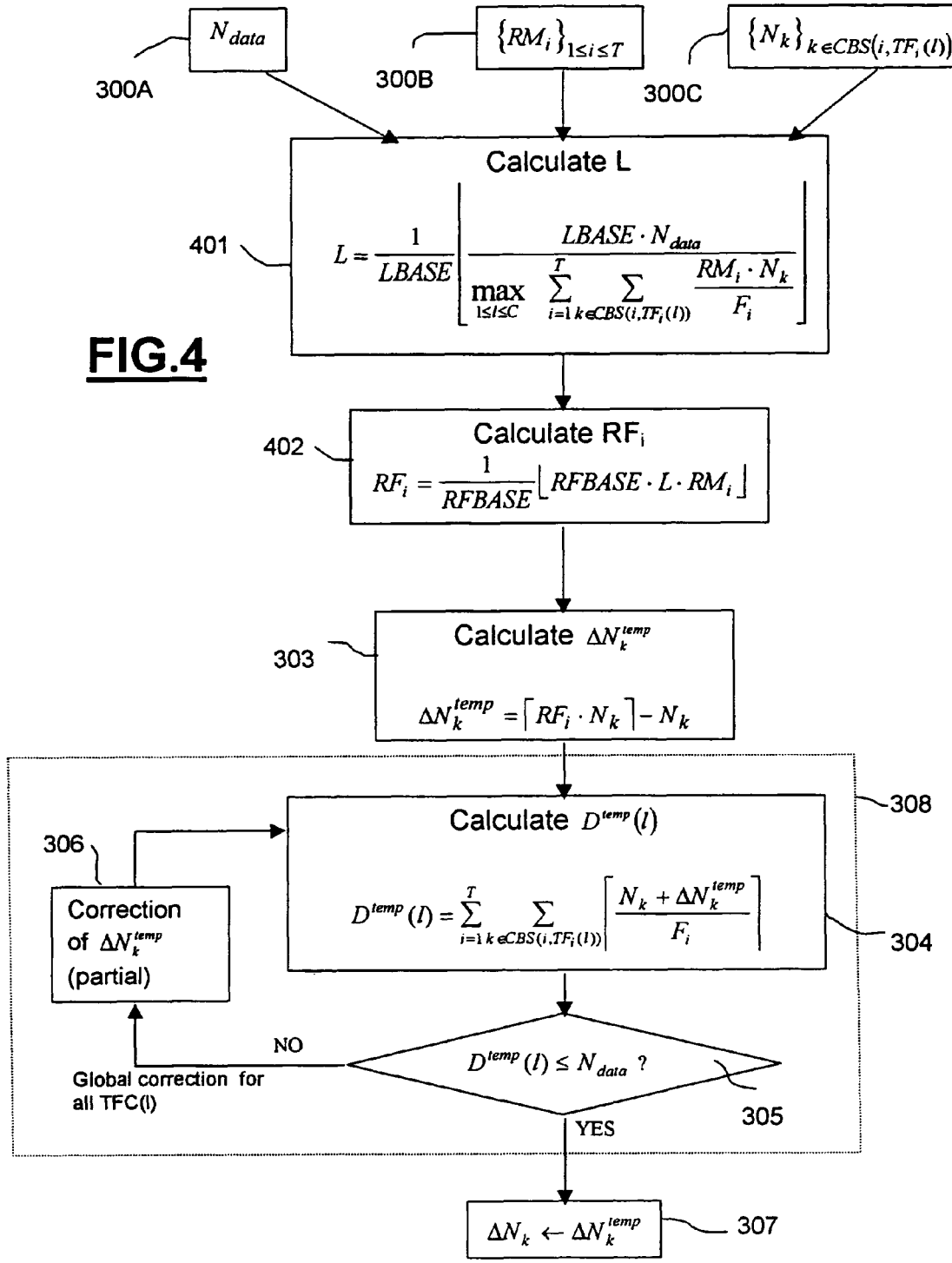
FIG. 4 is a flow chart for explaining a first alternative of the implementation of the algorithm for the downlink according to the present invention.
Figure 5:
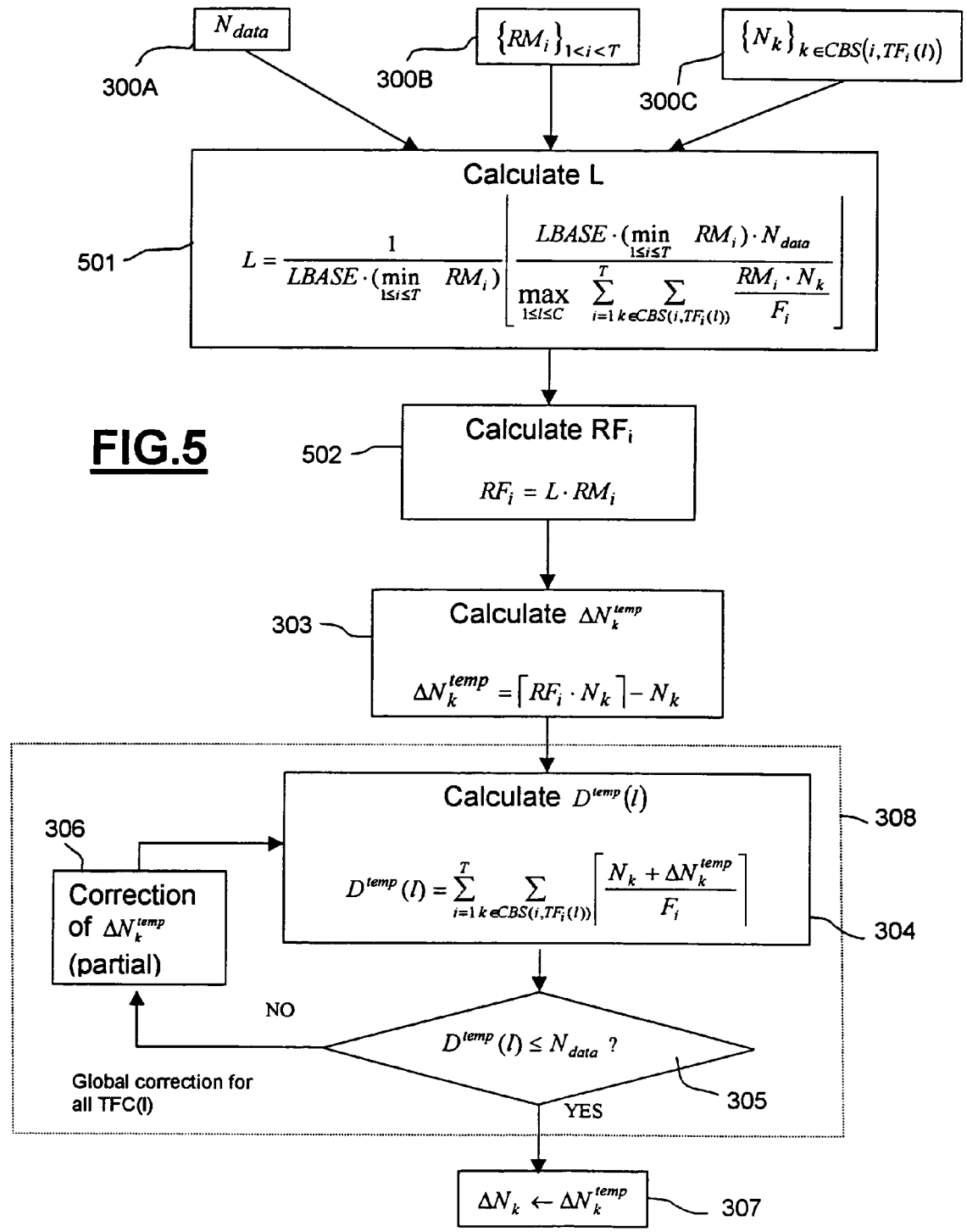
FIG. 5 is a flow chart for explaining a second alternative of the implementation of the algorithm for the downlink according to the present invention.

In the first phase, temporary variations denoted $\Delta N_k^{temp}$ are calculated so as to satisfy equation (11). In the second phase, these temporary variations are corrected by a "global" correction step in order to satisfy the relation (10), and in the third phase the final variations are generated by assigning the most recent temporary variations obtained to them. These three phases are illustrated in FIGS. 3, 4 and 5 which show three different methods of calculating the variations $\Delta N_k$. Identical steps are referenced by the same number in each of these figures.

Phase 1: Calculation of Temporary VARIATIONS

Note that $N_k + \Delta N_k \cong RF_i \cdot N_k$ is true for all values of $k \in CBS(i, j)$. According to equation (5), we can then write:

$$D(1) = L \cdot \sum_{i=1}^{i=T} \sum_{k \in CBS(i,TF_i(1))} \frac{RM_i \cdot N_k}{F_i} \quad (12)$$

The member at the right of this equation is a rate estimator of the composite CCTrCH for the transport formats combination 1. This equation (12) can then be used to find an approximate value of the factor L maximized under the constraint represented by equation (10) to satisfy equation (11). According to a first embodiment illustrated in FIG. 3, this value is given by the following equation:

$$L = \frac{N_{data}}{\max_{1 \leq 1 \leq C} \sum_{i=1}^{i=T} \sum_{k \in CBS(i,TF_i(1))} \frac{RM_i \cdot N_k}{F_i}} \quad (13)$$

Note that the denominator in the member at the right of equation (13) is the maximum value of the rate estimator of the composite CCTrCH for the transport format combinations and calculated assuming L=1 (which is equivalent to assume fictitiously that $RF_1 = RM_i$).

This calculation step is denoted 301 in FIG. 3. Note that transmission of the $N_{data}$ parameter is referenced 300A in FIG. 3. Similarly, the transmission of parameters $\{RM_i\}_{1 \leq i \leq T}$ and the transmission of the numbers of symbols $\{N_k\}_{k \in CBS(i,TFi(1))}$ are denoted 300B and 300C respectively.

We then determine the values of the various rate matching ratios $RF_i$, making use of equations (5) and (13), in a step 302.

The temporary variation $\Delta N_k^{temp}$ for each type k is then determined in a step 303, for example using the following equation:

$$\begin{cases} \forall i \in \{1, \ldots, T\} \\ \forall j \in TFS(i) \quad \Delta N_k^{temp} = \lceil RF_i \cdot N_k \rceil - N_k \\ \forall k \in CBS(i, j) \end{cases} \quad (14)$$

As a variant, equation (14) could be replaced by equation (14bis) given below. This equation has the advantage that the number of symbols after rate matching $N_k + \Delta N_k$ provided (assuming $\Delta N_k = \Delta N_k^{temp}$) at the beginning of the segmentation step 122 (FIG. 1) is a multiple of the number $F_i$ of segments to be produced. Thus, all segments originating from the same block have the same number of symbols, which simplifies the receiver since the number of symbols does not vary during the TTI interval.

$$\begin{cases} \forall\, i \in \{1, \ldots, U\} \\ \forall\, j \in TFS(i) \quad \Delta N_k^{temp} = F_i \left\lceil \dfrac{RF_i \cdot N_k}{F_i} \right\rceil - N_k \\ \forall\, k \in CBS(i, j) \end{cases} \quad (14\text{bis})$$

As a variant, it would be possible to use a rounding function other than the $x \to \lceil x \rceil$ function in equation (14) or (14bis). For example, it would be possible to use the $x \to \lfloor x \rfloor$ function, where $\lfloor x \rfloor$ is the largest integer less than or equal to x.

It would also be possible to consider calculating the factor L and the rate matching ratio $RF_i$ by making approximations, for example by expressing L and/or $RF_i$ as a fixed decimal number with a limited number of digits after the decimal point. This embodiment is illustrated in FIG. 4.

Thus as a variant, the factor L is calculated using the following equation, in a step 401:

$$L = \dfrac{1}{LBASE} \cdot \left\lfloor \dfrac{LBASE \cdot N}{\max\limits_{1 \leq l \leq C} \sum\limits_{i=1}^{i=T} \sum\limits_{k \in CBS(i,TF_i(1))} \dfrac{RM_i \cdot N_k}{F_i}} \right\rfloor \quad (13\text{bis})$$

where LBASE is an integer constant, for example a power of 2 such as $2^n$, where n is the number of bits in the L factor after the decimal point.

The rate matching ratios $RF_i$ are then calculated in a next step 402 using the following equation:

$$\forall\, iRF_i = \dfrac{1}{RFBASE} \cdot \lfloor RFBASE \cdot L \cdot RM_i \rfloor \quad (5\text{bis})$$

where RFBASE is an integer constant, for example a power of 2 such as $2^n$, where n is the number of bits after the decimal point in $RF_i$.

In the same way as for equations (5) and (14), the $x \to \lfloor x \rfloor$ function in equations (5bis) and (14bis) can be replaced by any other rounding function.

According to a third embodiment illustrated in FIG. 5, the expression of the factor L is modified by using a coefficient that depends on known data (for example $\{RM_i\}$ or $N_{data}$), in the numerator and in the denominator. This could have an impact on the calculated values to the extent that the expression of the factor L uses an approximation. For example, the following equation could be used:

$$L = \dfrac{1}{LBASE \cdot (\min\limits_{1 \leq i \leq T} RM_i)} \cdot \left\lfloor \dfrac{LBASE \cdot (\min\limits_{1 \leq i \leq T} RM_i) \cdot N_{data}}{\max\limits_{1 \leq l \leq C} \sum\limits_{i=1}^{i=T} \sum\limits_{k \in CBS(i,TF_i(1))} \dfrac{RM_i \cdot N_k}{F_i}} \right\rfloor \quad (13\text{ter})$$

The rate matching ratios $RF_1$ are then calculated using equation (5) or (5bis).

In summary, the phase in which the temporary variations $\Delta N_k^{temp}$ are calculated comprises the following steps:

1. Calculate the factor L as a function of the maximum physical rate $N_{data}$ and the $RM_i$ parameters (step 301, 401 or 501).

2. Calculate the rate matching ratio $RF_i$ for each coded transport channel i, as a function of the $RM_i$ parameters and the factor L (step 302, 402 or 502).

3. For each k type coded block in a coded transport channel i, calculate the temporary variation $\Delta N_k^{temp}$ as a function of the number of symbols $N_k$ before rate matching and the rate matching ratio $RF_i$ (step 303).

Phase 2: Global Correction of Temporary Variations

In this second phase, an iterative check is carried out to verify that the number of symbols $D^{temp}(1)$ per multiplexing frame for the CCTrCH composite is less than or equal to the maximum physical rate $N_{data}$, for each transport format combination with index 1, where $D^{temp}(1)$ is determined using current values of temporary variations $\Delta N_k^{temp}$, in other words initially with variations determined during the first phase and then with the most recent temporary variations calculated during the second phase. If necessary, the value of the temporary variations $\Delta N_k^{temp}$ is corrected. This step is also called the global temporary variations correction step for all transport format combinations 1. This step is marked as reference 308 in FIGS. 3, 4 and 5.

If equation (9) is rewritten with temporary variations $\Delta N_k^{temp}$, the following expression of the temporary rate $D^{temp}(1)$ of the composite is obtained:

$$D^{temp}(1) = \sum_{i=1}^{T} \sum_{k \in CBS(i,TF_i(1))} \left\lceil \dfrac{N_k + \Delta N_k^{temp}}{F_i} \right\rceil \quad (9\text{bis})$$

This calculation is carried out in step 304 in FIGS. 3, 4 and 5. As described previously, this second phase implies that $D^{temp}(1) \leq N_{data}$, for each transport format combination with index 1.

Every time that a transport format combination 1 is detected such that $D^{temp}(1) > N_{data}$, then the values of some temporary variations $\Delta N_k^{temp}$ are corrected by a "partial correction" step. Thus, the values of some temporary variations $\Delta N_k^{temp}$ are reduced in this step so that the temporary rate $D^{temp}(1)$ of the composite is less than the maximum physical rate $N_{data}$ after correction.

Considering that the temporary rate $D^{temp}(1)$ of the composite is an increasing function that depends on temporary variations $\Delta N_k^{temp}$, a partial correction applied to the transport format combination with index 1 does not change the result of verifications already made for previous transport format combinations. Therefore, there is no point of rechecking that $D_{temp}(1) \leq N_{data}$ for previously verified combinations.

The second phase is summarized by the following algorithm:

for all values of 1 from 1 to C, do
   if $D^{temp}(1) \leq N_{data}$ then
   partial correction of $\Delta N_k^{temp}$ values
   end if
end do.

The step in which the maximum physical rate $N_{data}$ is compared with the temporary rate $D^{temp}(1)$ of the composite and the step in which temporary variations $\Delta N_k^{temp}$ are partially corrected, are denoted 305 and 306 respectively in FIGS. 3, 4 and 5. The final variations $\Delta N_k$ are the temporary variations $\Delta N_k^{temp}$ obtained at the end of the second phase. This assignment step forms the third phase.

We will now describe the partial correction step of the temporary variations $\Delta N_k^{temp}$ mentioned in line 3 of the previous algorithm. In the remainder of the description of the partial correction, all notation used is applicable for a current index 1 of the transport format combination. 1 is not always given in the new expressions, in order to simplify the notation.

Remember that MBS(1) is the set of coded block indexes for the transport format combination 1. In other words, we have:

$$MBS(1) = \bigcup_{1 \leq i \leq T} CBS(i, TF_i(1))$$

Let U be the number of elements of MBS(1). Since MBS (1) is a set of integer numbers, it is ordered into the canonical order of integer numbers. Therefore, it is possible to define a strictly increasing monotonic bijection K from $\{1, \ldots, U\}$ to MBS(1). We then have:

$$MBS(1) = \{K(1), K(2), \ldots, K(U)\}$$

where $$K(1) < K(2) < \ldots K(U)$$

Note that any other ordering rule can be used as a variant, for example another bijection of $(1, \ldots, U)$ to MBS(1). $(K(1), \ldots, K(U))$ defines an ordered list. Similarly, for every coded block with index k in MBS(1), there is a single coded transport channel i producing this coded block for the transport format combination with index 1 such that $k \in CBS(i, TF_i(1))$. Therefore, it is possible to univocally define an application I from $\{1, \ldots, U\}$ to $\{1, \ldots, T\}$, which identifies the single transport channel with index $i=I(x)$ such that $k \in CBS(i, TF_i(1))$ for each coded block with index $k=K(x)$.

Thus, a partial sum $S_m$ can be defined for all values of $m \in \{1, \ldots, U\}$, for m equal to U, a total sum $S_U$, and an coefficient $Z_m$ increasing as a function of m such that:

$$S_m = \sum_{x=1}^{x=m} RM_{1(x)} \cdot \frac{N_{K(x)}}{F_{1(x)}} \quad (16)$$

$$Z_m = \left\lfloor \frac{S_m}{S_u} \cdot N_{data} \right\rfloor \quad (17)$$

Note that, like for any coded transport channel i, 8 is a multiple of the duration $F_i$ expressed as a number of multiplexing frames in the TTI interval in the coded transport channel i, then the partial sum $S_m$ can be coded without approximation as a fixed decimal number with 3 bits after the decimal point.

As a variant, the $x \rightarrow \lfloor x \rfloor$ rounding function in equation (17) may be replaced by any other increasing monotonic rounding function.

Assuming $Z_0 = 0$, new variations called the intermediate variations $\Delta N_k^{new}$ can then be defined and can replace the temporary variations $\Delta N_k^{temp}$ used for the transport format combination 1. These intermediate variations $\Delta N_{K(x)}^{new}$ are given by the following equation:

$$\forall x \in \{1, \ldots, U\} \ \Delta N_{K(x)}^{new} = (Z_x - Z_{x-1}) \cdot F_{1(x)} - N_{K(x)} \quad (18)$$

In summary, temporary variations $\Delta N_k^{temp}$ are partially corrected using the following algorithm:
for all x from 1 to U, do
  if $\Delta N_{K(x)}^{temp} \geq \Delta N_{K(x)}^{new}$ then
    $\Delta N_{K(x)}^{temp} \leftarrow \Delta N_{K(x)}^{new}$
  end if
end do.

Note that the ← symbol in the third line of the algorithm means that the value of $\Delta N_{K(x)}^{temp}$ is changed, and that it is replaced by the value of $\Delta N_{K(w)}^{new}$.

Figure 6:
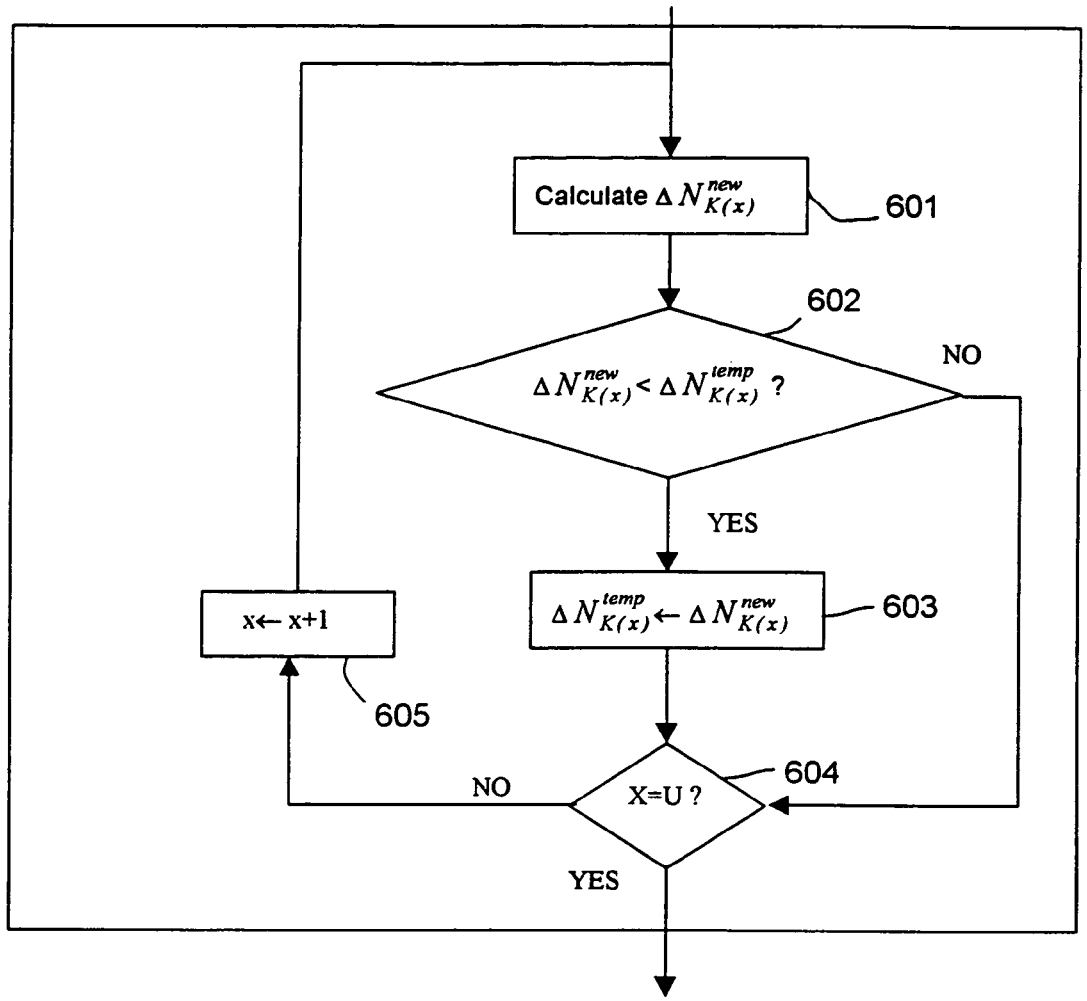
FIG. 6 is a flow chart for explaining the implementation of the global correction for the downlink according to the present invention.
Figure 7:
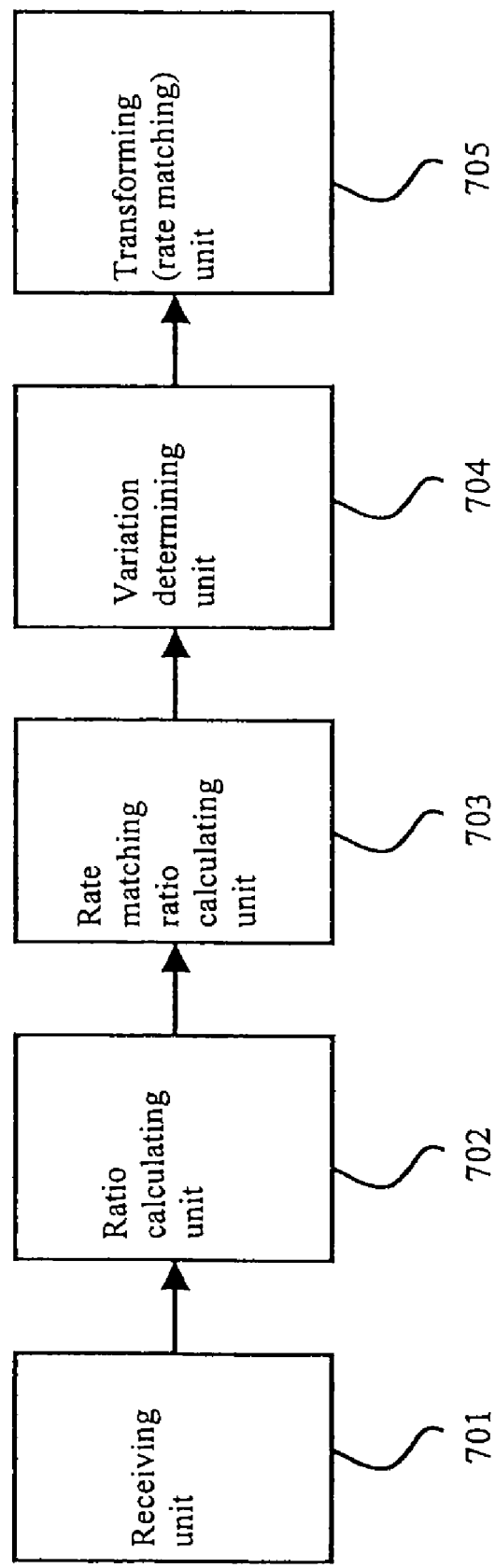
FIG. 7 is a block diagram of an example embodiment consistent with one aspect of this disclosure.

This partial correction step is illustrated in FIG. 6. In a first step 601, the intermediate variation $\Delta N_{K(x)}^{new}$ is calculated and is then compared with the value of the corresponding temporary variation $\Delta N_{K-(x)}^{temp}$ in a step 602. If $\Delta N_{K-(x)}^{temp} > \Delta N_{K(x)}^{new}$, the value of the intermediate variation $\Delta N_{K-(x)}^{temp}$ is assigned to the temporary variation $\Delta N_{K-(x)}^{temp}$ in a step 603, and then the next step 604 is executed. If $\Delta N_{K-(x)}^{temp} < \Delta N_{K(x)}^{new}$, the next step 604 is executed directly. In this step 604, it is checked whether x is equal to the value U. If it is not, x is incremented in a step 605, and then step 601 is carried out again with this new value of x. If x is equal to U, the partial correction step is terminated.

Phase 3: Determination of Final Variations

Remember that during this third phase, the value of the final variations $\Delta N_k$ are the values of the temporary variations $\Delta N_k^{temp}$ originating from the second phase. This phase corresponds to step 307 in FIGS. 3, 4 and 5. Consequently, the value of the final rate D(1) of the composite is equal to the value given by equation (9), for a given transport formats combination 1.

In order to enable blind rate detection, a "fixed service positions" technique comprises the step in which DTX symbols are inserted in step 116 such that the rate (including DTX symbols) at the end of this step 116 is constant.

Consequently, all steps following encoding of the channel are carried out independently of the current rate. Thus in reception, demultiplexing, deinterleaving steps, etc., can be carried out in advance without knowing the current rate. The current rate is then detected by the channel decoder (performing the reverse of the operation done by the channel encoder 108).

In order for the step inverse to step 118 of rate matching to be independent of the current rate, the puncturing pattern or repetition pattern should be independent of the rate, in other words the number of coded blocks and the numbers of symbols N in each.

Thus firstly, in the case of fixed service positions there is never more than one coded block per TTI interval, and in fact it is considered that there is always one if it is assumed that the lack of a coded block is equivalent to the presence of a coded block without a symbol. Consequently, the number of blocks does not vary as a function of the rate.

The optimum puncturing/repetition pattern depends on the N and ΔN parameters giving the number of symbols before rate matching and the variation due to rate matching, respectively. Therefore, these two parameters need to be constant to obtain a pattern independent of the rate, in other words the rate matching step 118 should be placed after step 122 in which DTX symbols are inserted. However, since all DTX symbols are identical, puncturing them or repeating them at predetermined positions induces unnecessary complexity (the same result can be achieved by puncturing or repeating the last DTX symbols in the block, and this is easier to implement). Therefore, it was decided that the rate matching step 118 and the DTX symbol insertion step 122 would be carried out in this order as shown in FIG. 1, but that the repetition/puncturing pattern would be determined only for the case in which the composite is at its maximum rate. The pattern thus obtained is truncated for lower rates.

Note that in prior art, the fixed service positions and flexible service positions are two mutually exclusive techniques. In the invention, it is possible to have some transport channels in fixed service positions, and other channels in flexible service positions. This makes it possible to carry out blind rate detection only for transport channels in fixed service positions, and a rate detection using an explicit rate information for the other transport channels. Thus, the explicit rate information, TFCI, only indicates current transport formats for transport channels in flexible service positions. The result is that a lower capacity is necessary for TCFI transmission.

In the case of combined fixed and flexible service positions, some composite transport channels are in fixed service positions and others are in flexible service positions. Step 116 in which DTX symbols are inserted is only present for coded transport channels in fixed service positions, and it is missing for other transport channels that are in flexible service positions. Furthermore, the DTX symbol insertion step 132 is present if there is at least one coded transport channel in fixed service positions, and otherwise it is missing.

During reception of a multiplexing frame and the associated TFCI, the receiver may implement all steps inverse to those following the channel encoding. The TFCI information gives it the encoding format of coded transport channels in flexible service positions, and for transport channels in fixed service positions, the receiver acts as if they were in the highest rate transport format.

In the invention, the repetition/puncturing pattern depends on the two parameters N and ΔN, regardless of whether the coded transport channel is in the fixed service positions or flexible service positions, however in the flexible service position N and ΔN correspond to the number of symbols before rate matching and to the variation of this number during the rate matching step 118 respectively, while in fixed service positions they are only two "fictitious" parameters used to determine the puncturing pattern when the coded transport channel rate is not maximum. In other words, these two parameters correspond to the size of the block for which the rate is to be matched, and its variation after rate matching when the rate of the coded transport channel is maximum.

When the rate of the coded transport channel is not maximum, the puncturing/repetition pattern is truncated. This pattern is actually a list of symbol positions that are to be punctured/repeated. Truncating consists of considering only the first elements in this list, which are real positions in the block for which the rate is to be matched.

Thus according to the invention, when there is at least one coded channel in the fixed service positions, rate matching parameters are determined in the same way as when all coded transport channels are in the flexible service positions, except that coded transport channels in fixed service positions are considered fictitiously to be at their maximum rate.

Figure 2:
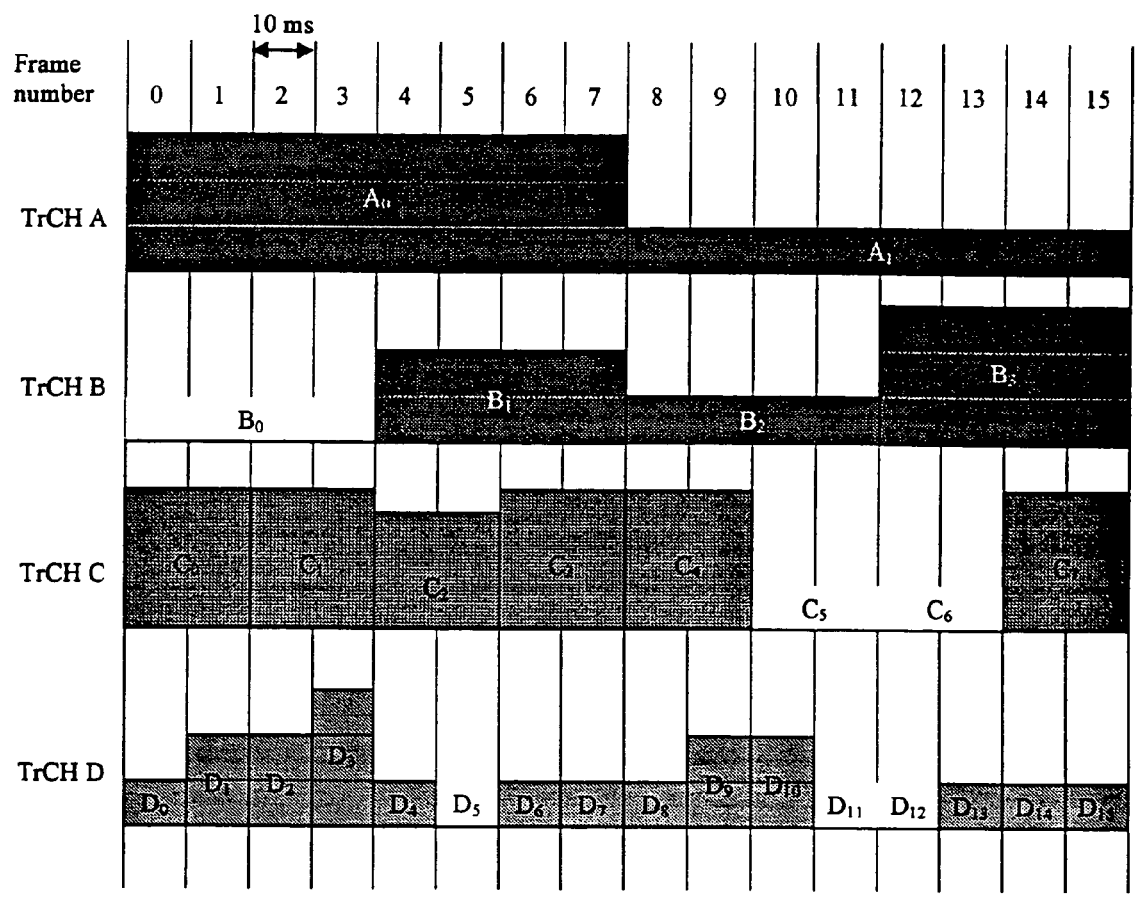
FIG. 2 is an example of variable transport channel bit rates according to the prior art.

Consider the example in FIG. 2, and assume that coded transport channel D is in the fixed service position, whereas transport channels A, B and C are in flexible service positions. The table below shows the list of transport format combinations for this example.

| Combination index | Transport format for transport channels | | | | example frame with this combination |
|---|---|---|---|---|---|
| | A | B | C | D | |
| 0 | 0 | 2 | 0 | 0 | 11 |
| 1 | 0 | 2 | 0 | 2 | 10 |
| 2 | 0 | 3 | 0 | 0 | 12 |
| 3 | 0 | 3 | 0 | 1 | 13 |
| 4 | 0 | 2 | 2 | 1 | 8 |
| 5 | 2 | 0 | 2 | 1 | 0 |
| 6 | 0 | 2 | 2 | 2 | 9 |
| 7 | 2 | 1 | 1 | 0 | 5 |
| 8 | 2 | 0 | 2 | 2 | 1 and 2 |
| 9 | 0 | 3 | 2 | 1 | 14 and 15 |
| 10 | 2 | 1 | 1 | 1 | 4 |

-continued

| Combination index | Transport format for transport channels | | | | example frame with this combination |
|---|---|---|---|---|---|
| | A | B | C | D | |
| 11 | 2 | 0 | 2 | 3 | 3 |
| 12 | 2 | 1 | 2 | 1 | 6 and 7 |

The rate matching configuration parameters are calculated in the same way as for flexible service positions, except that it includes the additional prior step of fictitiously replacing the column in this table corresponding to coded transport channel D, by setting all elements to the transport format for the highest rate, in other words the transport format with index 3. This gives the following "fictitious" table in which the boxes that have been modified and which correspond to "fictitious" transport formats are shown in grey:

| Combination index | Transport format for transport channels | | | | Example frame with this combination |
|---|---|---|---|---|---|
| | A | B | C | D | |
| 0 | 0 | 2 | 0 | 3 | 11 |
| 1 | 0 | 2 | 0 | 3 | 10 |
| 2 | 0 | 3 | 0 | 3 | 12 |
| 3 | 0 | 3 | 0 | 3 | 13 |
| 4 | 0 | 2 | 2 | 3 | 8 |
| 5 | 2 | 0 | 2 | 3 | 0 |
| 6 | 0 | 2 | 2 | 3 | 9 |
| 7 | 2 | 1 | 1 | 3 | 5 |
| 8 | 2 | 0 | 2 | 3 | 1 and 2 |
| 9 | 0 | 3 | 2 | 3 | 14 and 15 |
| 10 | 2 | 1 | 1 | 3 | 4 |
| 11 | 2 | 0 | 2 | 3 | 3 |
| 12 | 2 | 1 | 2 | 3 | 6 and 7 |

By definition, coded transport channels i in the fixed services positions, have not more than one coded block per TTI interval ($\forall j \in TFS(i)$ CBS(i, j) has not more than one element).

Furthermore, in the invention it is assumed that coded block sizes are indexed such that the absence of a coded block for coded transport channels in fixed service positions leads to indexing with the convention that the absence of a block is equivalent to the presence of a zero size block (i.e. an index k is assigned with $N_k=0$, and therefore $\forall j \in TFS(i)$ CBS(i, j) has at least one element).

With the previous assumptions, the first phase in the calculation of the temporary variations $\Delta N_k^{temp}$, which has already been described, must be preceded by the following step when there is at least one coded transport channel in the fixed service positions.

```
For all i from 1 to T do
    if the coded transport channel with index i is
        in the fixed service positions then
    for all values of j in TFS(i), do
        let k be the single element of CBS(I,j)

$N_k \leftarrow \max_{\substack{j' \in TFS(i) \\ k' \in CBS(k,j')}} N_{k'}$ end do
    end if
end do
```

The fifth instruction means that the coded transport channel i is fictitiously considered to be at its maximum rate; its actual rate ($N_k$) is replaced ($\leftarrow$) by its maximum rate $$(\max_{\substack{j' \in TFS(i) \\ k' \in CBS(k,j')}} N_{k'}).$$

The invention claimed is:

1. A method for a telecommunication system including a plurality of communication devices, said telecommunication system using a Code Division Multiple Access type technology, at least one of said plurality of communication devices transmitting data on at least one physical channel, said at least one physical channel transmitting a transport channel composite and having a maximum physical bit rate, said transport channel composite including data of a plurality of transport channels, each transport channel having at least one transport format, said at least one transport format being predetermined for each transport channel, each of said transport channels being processed by a separate and distinct processing procedure, said method comprising the steps of:
 transforming, for each of said transport channels in said telecommunication system, an input number of bits into an output number of bits;
 calculating a ratio of said maximum physical rate to a maximum value of rate estimators in said telecommunication system;
 calculating a rate matching ratio for each of said transport channels in said telecommunication system by multiplying said ratio obtained in said calculating step by a rate matching parameter for said transport channel, said rate matching parameter controlling said rate matching ratio for said transport channel; and
 determining, for each of said transport channels in said telecommunication system, a variation between the output number of bits and the input number of bits, said output number of bits being calculated by multiplying said rate matching ratio by said input number of bits, said determining step being implemented before said transforming step.

2. A communication apparatus for use in a telecommunication system including a plurality of entities and transmitting data on at least one physical channel, said at least one physical channel transmitting a transport channel composite and having a maximum physical bit rate, said transport channel composite including data of a plurality of transport channels, each transport channel having at least one transport format, said at least one transport format being predetermined for each transport channel, each of said transport channels being processed by a separate and distinct processing procedure, at least one of said entities having rate matching means for transforming a number of bits before rate matching into a number of bits after said rate matching, said communication apparatus comprising:
 means for receiving a first parameter controlling a rate matching ratio for at least one of said transport channels;
 means for calculating a ratio of said maximum physical bit rate to a maximum value of rate estimators;
 means for calculating a rate matching ratio of each of said transport channels by multiplying said ratio of said maximum physical bit rate to said maximum value of rate estimators by said first parameter; and
 means for determining, for each of said transport channels, a variation between the number of bits after said rate matching and the number of bits before said rate matching, said number of bits after said rate matching being calculated by multiplying said rate matching ratio by said number of bits before said rate matching.

3. A communication apparatus for use in a telecommunication system including a plurality of entities, said telecommunication system using a Code Division Multiple Access type technology, at least one of said entities transmitting data on at least one physical channel, said at least one physical channel transmitting a transport channel composite and having a maximum physical bit rate, said transport channel composite including data of a plurality of transport channels, each transport channel having at least one transport format, said at least one transport format determined for each transport channel, each of said transport channels being processed by a separate and distinct processing procedure, said communication apparatus comprising:
 means for transforming, for each of said transport channels, an input number of bits into an output number of bits;
 means for calculating a ratio of said maximum physical bit rate to a maximum value of rate estimators;
 means for calculating a rate matching ratio of each of said transport channels by multiplying said ratio of said maximum physical bit rate to said maximum value of said rate estimators by a rate matching parameter determined for said transport channel, said rate matching parameter controlling said rate matching ratio for said transport channel; and
 means for determining, for each of said transport channels, a variation between the output number of bits and the input number of bits, said output number of bits being calculated by multiplying said rate matching ratio by said input number of bits.

4. A communication method of a communication apparatus used in a telecommunication system, said telecommunication system including a plurality of entities and transmitting data on at least one physical channel, said at least one physical channel transmitting a transport channel composite and having a maximum physical bit rate, said transport channel composite including data of a plurality of transport channels, each transport channel having at least one transport format, said at least one transport format determined for each transport channel, each of said transport channels being processed by a separate and distinct processing procedure, at least one of said entities having rate matching means for transforming a number of bits before rate matching into a number of bits after said rate matching, said method comprising the steps of:
 receiving a first parameter controlling a rate matching ratio for at least one of said transport channels in said communication apparatus;
 calculating a ratio of said maximum physical bit rate to a maximum value of rate estimators in said communication apparatus;
 calculating a rate matching ratio for each of said transport channels in said communication apparatus by multiplying said ratio obtained in said calculating step by said first parameter; and
 determining, for each of said transport channels in said telecommunication apparatus, a variation between the number of bits after said rate matching and the number of bits before said rate matching, the number of bits after said rate matching being calculated by multiplying said rate matching ratio by the number of bits before said rate matching.

* * * * *